United States Patent [19]

Jones

[11] 4,424,281
[45] Jan. 3, 1984

[54] REFRACTORY CEMENT
[75] Inventor: Cecil M. Jones, Worcester, Mass.
[73] Assignee: Norton Company, Worcester, Mass.
[21] Appl. No.: 423,581
[22] Filed: Sep. 27, 1982

Related U.S. Application Data

[63] Continuation-in-part of Ser. No. 390,566, Jun. 21, 1982, abandoned.

[51] Int. Cl.³ ............... C04B 35/10; C04B 35/52
[52] U.S. Cl. .................................. 501/89; 501/100; 501/127; 501/128
[58] Field of Search ............... 501/89, 100, 127, 128

[56] References Cited

U.S. PATENT DOCUMENTS

| | | | |
|---|---|---|---|
| 1,277,227 | 8/1918 | Linbarger | 501/90 |
| 1,289,578 | 12/1918 | Tone | 501/100 |
| 2,845,360 | 7/1958 | King et al. | 106/104 |
| 2,852,401 | 9/1958 | Hansen et al. | 106/55 |
| 3,617,319 | 11/1971 | Sadran et al. | 106/104 |
| 3,765,914 | 10/1973 | LaBar et al. | 501/128 |
| 3,846,144 | 11/1974 | Parsons et al. | 106/56 |
| 3,854,966 | 12/1974 | Kanbara et al. | 106/64 |
| 4,060,424 | 11/1977 | Hofmann | 106/55 |
| 4,066,467 | 1/1978 | Rechter | 501/100 |
| 4,204,878 | 5/1980 | Nudelman et al. | 106/104 |
| 4,210,454 | 7/1980 | Rechter | 501/128 |
| 4,222,782 | 9/1980 | Alliegro et al. | 106/57 |
| 4,233,079 | 11/1980 | Rechter | 501/100 |
| 4,306,030 | 12/1981 | Watanabe et al. | 501/100 |

*Primary Examiner*—James Poer
*Attorney, Agent, or Firm*—Arthur A. Loiselle, Jr.

[57] ABSTRACT

A dry ramming refractory cement composed principally of coarse dense alumina grains, silicon metal powder, calcined alumina and sodium hexametaphosphate, and optionally one or more materials from the group including silicon carbide, fused white alumina, chromia, periclase, kyanite, graphite and cryolite.

17 Claims, No Drawings

REFRACTORY CEMENT

This application is a continuation-in-part of application Ser. No. 06/390,566 filed June 21, 1982 now abandoned.

FIELD OF THE INVENTION

This invention relates to a dry ramming cement, especially suitable for forming linings in troughs, runners and the like for conveying molten iron and slag, and for forming walls in metal melting furnaces. More particularly a refractory cement formulation is shown that has particular properties that adapt it well for use in induction furnace walls and troughs and runners from blast furnaces for processing molten iron having high lime-silica slags.

PRIOR ART STATEMENT

The following United States Letters Patents are representative of the most relevant prior art known to the Applicant at the time of the filing of the application:
U.S. Pat. No. 1,277,227 to Linbarger, 8/27/18; U.S. Pat. No. 1,289,578 to Tone, 12/31/18; U.S. Pat. No. 2,845,360 to King et al, 7/29/58; U.S. Pat. No. 2,852,401 to Hansen et al, 9/16/58; U.S. Pat. No. 3,617,319 to Sadran et al, 11/2/71; U.S. Pat. No. 3,846,144 to Parsons et al, 11/5/74; U.S. Pat. No. 3,854,966 to Kanbara et al, 12/17/74; U.S. Pat. No. 4,060,424 to Hofmann, 11/29/77; U.S. Pat. No. 4,204,878 to Nudelman et al, 5/27/80 and U.S. Pat. No. 4,222,782 to Alliegro et al, 9/16/80.

Linbarger U.S. Pat. No. 1,277,227 and Tone U.S. Pat. No. 1,289,578 show refractory formulations adapted for mixing with water and designed to be cast into a shape for subsequent firing before being put into use as a crucible or the like.

A number of the above noted references show refractory cements that are designed to be mixed with water and cast or otherwise formed into a desired shape such as disclosed in King et al U.S. Pat. No. 2,845,360, Hansen et al U.S. Pat. No. 2,852,401, Sandran et al U.S. Pat. No. 3,617,319, Parsons et al U.S. Pat. No. 3,846,144, Kanbara et al U.S. Pat. No. 3,854,966, and Nudelman et al U.S. Pat. No. 4,204,878.

The Hofmann patent U.S. Pat. No. 4,060,424 and the Alliegro et al patent U.S. Pat. No. 4,222,782 each describes a refractory cement that may be placed in a dry condition by vibratory or a ramming procedure. The Hoffmann product may be used either as a dry ramming cement or it may be mixed with water to be placed with a gunning action. Both of these last two mentioned patents disclose refractory layers that are fired in place to sinter the constituent grains in the cement and promote reactions within the mass of the mix after it is in place to produce a protective refractory surface for containing molten metal.

The Hofmann and Alliegro et al patents both include discussions of other cements known in the prior art, which discussions are incorporated herein by reference.

DISCLOSURE OF THIS INVENTION

The present formulation builds on the known art and provides an improved refractory ramming cement that is easy to install in its dry state to form a wall in induction furnaces and in troughs and runners to receive molten metal flowing from a blast furnace. The furnace's troughs and runners can be put into use immediately after the cement has been put in place. This cement provides a combination of refractory grain in selected sizes that may be sintered in situ to form a liner especially adapted to receive molten ferrous metal and slag, including lime silica slags. The cement is conditioned by the molten metal flow to form a permanent liner in a furnace and in a trough and its runners or the like, which liner provides improved resistance to corrosion that is caused by the flow of molten iron and particularly the slag flowing from a blast furnace or contained in an induction furnace used to melt iron.

The cement includes a preponderance of from 45 to 80% by weight of dense alumina in grain sizes varying from 6 to 20 mesh size and finer, together with smaller proportions of from 5 to 10% by weight of a fine calcined alumina, from 0.25 to 5% by weight of silicon metal particles and from 0.5 to 3% by weight of $(NaPO_3)_6$. (All mesh sizes are based on U.S. Standard Sieve Series.)

Optional ingredients may also be included in the cement mixture that may be selected from the compositions consisting of an amount of from 0 to 20% by weight of black silicon carbide of 150 mesh and finer, 0 to 20% by weight of fused white alumina 16 mesh and finer, 0 to 20% by weight of fused white alumina grain that is 70 mesh and finer, chromium oxide pigment in an amount of from 0 to 10% by weight that is one micron and finer, 0 to 5% of periclase (magnesia) that is 140 mesh and finer, kyanite $(Al_2O_3SiO_3)$ in an amount of from 0 to 8% by weight that is 200 mesh and finer, graphite powder in an amount of from 0 to 5% by weight that is 200 mesh and finer, and cryolite $(Na_3AlF_6)$ in an amount of from 0 to 3% by weight and in a mesh size of 200 mesh and finer.

While fused alumina is the peferred aggregate or grain, because of its high density and stability at high temperature, either tabular alumina or calcined refractory bauxite can be substituted in whole or in part for the fused alumina. These substitutions may result in a somewhat shorter life in use, but they result in a lower cost cement.

The $(NaPO_3)_6$ which may be in the form of readily available Calgon, is used as a bonding agent in the cement, which bond is active over a wide range of temperatures. The silicon metal powder is provided in the cement mix to combine with any oxygen that may be present in or that would otherwise penetrate into the cement, to form $SiO_2$ that fills the pores within the mass of the cement layer in order to produce a non-porous liner that resists the penetration of molten slag and iron into the body of the material lining the troughs or runners.

With respect to the optionally selected ingredients, the kyanite and fine alumina particles present in the cement when it is placed in a furnace wall or conduit, react when heated by the molten metal, to form mullite that fills pores and channels within the mass of the cement. This reaction begins during the initial sintering of the cement when the heat from the molten metal begins to flow into the cement, and the presence of the mullite reduces the tendency of the cement liner to shrink.

The graphite component may be added optionally to reduce the wetting of the cement by the molten iron and slag and is also useful when a fine silicon carbide additive is used in the cement mix, the graphite serving as a scavenger to inhibit oxidation of the silicon carbide. The black silicon carbide component may also be used as an optional ingredient in the mix to reduce the wetting of the cement by the molten slag and the black silicon carbide, which contains some free carbon, is preferred for this purpose.

The cryolite component may be used if needed as a flux to strengthen the cement at a temperature below the melting point of iron when deemed desireable.

Chromia and periclase may be added to form a spinel in situ within the body of the cement, to further close pores, which results in the most preferred cement.

A cement mixture made with the essential ingredients described above, or one that in addition includes any of the optional ingredients described, may be placed in a furnace or in trough and runner structures by tamping or vibration, as a dry composition, to form a liner adapted to receive molten iron and is especially recommended for use when such metal is refined in a process that results in the production of a slag that has a high lime-silica content. When the molten metal flows over the cement packed over the surface of the trough and its runners, the liner is sintered in situ and either the basic cement or a cement composition that includes various of the optional ingredients suggested above reacts as described, to fill the pores in the liner and bond it more permanently in place. As the molten flow continues, the sintering reaction progresses throughout the mass of the body of the liner layer which becomes stronger and more resistant to the corrosive action resulting from the iron and slag flowing through the trough and its associated runners. The cement layer becomes quickly bonded in place and as it is heated by the flow of molten metal the cement continues to mature until a strong, substantially impervious, non-porous, corrosion resistant liner for the conduit and runners is formed in situ to more efficiently contain a molten ferrous metal and any slag, including especially a high lime-silica containing slag flowing from a blast furnace.

When the present cements are utilized as the wall lining in, for example, an induction furnace used to melt iron in a foundry, the major erosion of the lining is due to the lime-silica slag which is present during the fusion.

EXAMPLES OF THE PREFERRED EMBODIMENTS

Mixtures of the ingredients described above, may be made in any conventionally known blending equipment to form a dry mixture that may be packed by vibration or any other known dry placement procedure to form a liner for equipment for containing molten iron and slag.

Several examples of prefered mixtures of such a cement that may be placed dry in furnace walls and in troughs and runners that form conduits for molten iron and slag, are the following:

| Material | Weight Percent | | | | Possible Range |
|---|---|---|---|---|---|
| | Mix A | Mix B | Mix C | Mix D | |
| Fused Dark Aluminum Oxide 6-10 mesh | 18 | 20 | 24 | 9 | 8-20 |
| Fused Dark Aluminum Oxide 12-16 mesh | 20 | 20 | 25 | 24 | 15-25 |
| Fused Dark Aluminum Oxide 20 mesh and finer | 20 | 25 | 35 | 24 | 20-35 |
| Black Silicon Carbide 150 mesh and finer | — | 15 | — | — | 0-20 |
| Fused White Alumina 16 mesh and finer | 15 | — | — | 15 | 0-20 |
| Fused White Alumina 70 mesh and finer | 10 | — | — | 10 | 0-20 |
| Calcined Aluminum Oxide 200 mesh and finer | 7 | 10 | 10 | 8 | 5-10 |
| Chromium Oxide Pigment less than 1 micron | 5 | — | — | — | 0-10 |
| Periclase MgO 140 mesh and finer | 3.5 | — | — | 7 | 0-5 |
| Kyanite Al$_2$O$_3$ SiO$_2$ 200 mesh and finer | — | 4 | — | — | 0-8 |
| Graphite Powder 200 mesh and finer | — | 3 | — | 3 | 0-5 |
| Silicon metal powder 90 mesh and finer | 0.5 | 1 | 3 | — | .25-3 |
| Calgon (NaPO$_3$)$_6$ 200 mesh and finer | 1 | 1 | 3 | — | .5-3 |
| Powdered Cryolite Na$_3$AlF$_6$ 200 mesh and finer | — | 1 | — | 0.5 | 0-3 |

(All mesh sizes are U.S. Standard Sieve sizes except for the chromia for which the longest average dimension of the individual particles in a batch of particles, as estimated from a microscopic analysis, is given.) Typically Mix B had a packing density of 170 lbs./ft.$^3$ while mixes A, C and D had packing densities of about 180 lbs./ft.$^3$.

Of the foregoing example mixes of the preferred embodiments, the most preferred is that exemplified by Mix A. When chromia and magnesia (periclase) are incorporated as a bonding medium in addition to the sodium hexameta-phosphate, the resulting cement is even more resistant to the corrosive and erosive effects of calcia-silica slag and the metal, than are the embodiments of mixes B, C, and D of the present invention, and dramatically more resistant than a current state of the art commercial cement composition which had the following weight percent formulation:

| | | |
|---|---|---|
| Fused Dark Aluminum Oxide | 6-10 mesh | 23 |
| Fused Dark Aluminum Oxide | 12-16 mesh | 23 |
| Fused Dark Aluminum Oxide | 20 mesh and finer | 10 |
| Silicon Carbide | 10 mesh and finer | 8 |
| Silicon Carbide | 90 mesh and finer | 10 |
| Graphite | 200 mesh and finer | 10 |
| Ball Clay | | 8 |
| Bentonite | | 2 |
| Silicon Nitride | 220 mesh | 5 |
| Goulac | | 1 |

The resistance of refractory linings to erosion by both molten cast iron and CaO/SiO₂ slag was measured using Mixes A, B, and D of the present invention, and the foregoing commercial cement composition as linings in an induction furnace. The test was carried out in the following manner:

A small induction furnace measuring 17.78 cm (7 inches) in inside diameter and 30.48 cm (12 inches) deep was lined with refractory made of compositions corresponding to Mixes A, B, D and the prior art cement formulation set out above. About 12.7 cm (5 inches) of the depth of the furnace was filled with cast iron and the iron heated to 1600° C. To the molten iron was added 0.23 kg (0.5 pound of a lime-silica slag having a CaO/SiO₂ ratio of about 1. The furnace run was continued for 5 hours with the old slag being removed and replaced by an equal amount of fresh slag every 0.5 hour of the five hours. After the 5 hour run the furnace was completely emptied and allowed to cool. The refractory lining of the furnace was removed and the wear or erosion of the thickness of the refractory wall was measured both where the iron and the slag had contacted the wall during the heating run. The total erosion of the wall thickness for the 5 hours in the case of each refractory composition was as follows:

| Refractory | Erosion Caused By: | |
|---|---|---|
| | Slag | Iron |
| A | 3.0 mm | <0.05 mm |
| B | 6.0 mm | 2.5 mm |
| D | 6.0 mm | 1.0 mm |
| Prior Art | 28.0 mm | 20.2 mm |

Mix C was not tested because it was basically a composition between those of mixes B and D.

As can be readily seen from the tabulated erosion data, all compositions of the present invention were far superior to the prior art refractory lining. Among the invention compositions, Mix A was clearly superior to both Mix B and Mix D. That superiority of Mix A was the result of the in situ formed chromia-magnesia spinel formed when the chromium oxide and periclase containing mix was heated during the initial phase of the iron melt; the chromium oxide and periclase combination was present only in Mix A.

The above description of the invention is based upon the best data known to the inventor at the present time and is not to be considered as limiting. The invention is set forth in the following claims:

What is claimed is:

1. A refractory cement mix adapted to be placed in a dry condition for forming linings for conduits for conveying molten iron and slag from a blast furnace by sintering the mix in situ in such conduit comprising a mixture of dense alumina grains of from 6 to 10 mesh in an amount by weight of 24%, dense alumina grains of from 12 to 16 mesh in an amount by weight of 25%, dense alumina grains 20 mesh and finer in an amount by weight of 35%, calcined alumina of from 200 mesh and finer in an amount by weight of 10%, silicon 90 mesh and finer in an amount by weight of 3%, and (NaPO₃)₆ 200 mesh and finer in an amount by weight of 3%.

2. A refractory cement mix adapted to be placed in a dry condition for forming linings for conduits for conveying molten iron and slag from a blast furnace by sintering the mix in situ in such conduit comprising a mixture of dense alumina grains of 6-10 mesh size present in a range of from 10 to 20% by weight of the mix, dense dark alumina of 12-16 mesh size and present in a range of from 15 to 25% by weight of the mix, dense alumina of 20 mesh size and finer present in an amount of from 20 to 35% by weight of the mix, calcined alumina of 200 mesh size and finer present in an amount of from 5 to 10% by weight of the mix, silicon in a size range of 90 mesh and finer present in an amount of from 0.25 to 3% by weight of the mix, (NaPO₃)₆ in a size range of 100 mesh and finer present in an amount of from 0.5 to 5% by weight of the mix, together with a material selected from the group consisting of silicon carbide, fused white alumina, chromia, periclase, kyanite, graphite, and cryolite and mixtures thereof.

3. A refractory cement mix as in claim 2 wherein the material selected from said group is present in a total amount of from 0 to 20% by weight of the mix.

4. A refractory cement mix as in claim 2 including silicon carbide present in a size range of less than one micron and in an amount of up to 20% by weight of the mix.

5. A refractory cement mix as in claim 4 wherein black silicon carbide is added to the mix.

6. A refractory cement mix as in any one of claims 2, 4 or 5 including kyanite in a size range of 200 mesh and finer in an amount of up to 8% by weight of the mix.

7. A refractory cement mix as in any one of claims 2, 4, or 5 including graphite 200 mesh and finer in an amount of up to 5% by weight of the mix.

8. A refractory cement mix as in any one of claims 2, 4, or 5, including cryolite in a size range of 200 mesh and finer and in an amount of up to 3% by weight of the mix.

9. A refractory cement mix as in claim 2 including periclase in a size range of 140 mesh and finer in an amount of up to 5% by weight of the mix.

10. A refractory cement as in any one of claims 2 or 9 including $Cr_2O_3$ in a size range of less than 1 micron and in an amount of up to 10% by weight of the mix.

11. A refractory cement mix as in any one of claims 2, or 9 including fused white alumina 16 mesh and finer in an amount of up to 20% by weight of the mix, and fused white alumina 70 mesh and finer in an amount of up to 20% by weight of the mix.

12. A refractory cement mix adapted to be placed in a dry condition for forming linings for conduits for conveying molten iron and slag from a blast furnace by sintering the mix in situ in such conduit comprising a mixture of fused dark alumina grains of 6-10 mesh size present in an amount of 18% by weight of the mix, fused dark alumina in a size range of 12-16 mesh present in an amount of 20% by weight of the mix, fused dark alumina 20 mesh and finer present in an amount of 20% by weight of the mix, fused white alumina of 16 mesh and finer present in an amount of 15% by weight of the mix, fused white alumina 70 mesh and finer present in an amount of 10% by weight of the mix, calcined alumina 200 mesh and finer present in an amount of 7% by weight of the mix, chromia in a size of less than 1 micron present in an amount of 5% by weight of the mix, periclase of 140 mesh size and finer present in an amount of 3.5% by weight of the mix, silicon metal present in a size of 90 mesh and finer in an amount of 0.5% by weight of the mix, and (NaPO₃)₆ in a size range of 200 mesh and finer and present in a size range of 1% by weight of the mix.

13. A refractory cement mix adapted to be placed in a dry condition for forming linings for conduits for conveying molten iron and slag from a blast furnace by sintering the mix in situ in such conduit comprising a mixture of fused dark alumina of a size from 6–10 mesh present in an amount of 20% by weight in the mix, fused dark alumina sized 12–16 mesh and present in an amount of 20% by weight of the mix, fused dark alumina sized 20 mesh and finer present in an amount of 25% by weight of the mix, black silicon carbide 150 mesh and finer present in an amount of 15% by weight of the mix, calcined alumina 200 mesh and finer present in an amount of 10% by weight of the mix, kyanite in a size of 200 mesh and finer present in an amount of 4% by weight of the mix, graphite powder 200 mesh and finer present in an amount of 3% by weight of the mix, silicon metal powder 90 mesh and finer present in an amount of 1% by weight of the mix, $(NaPO_3)_6$ in a size of 200 mesh and finer present in an amount of 1% by weight of the mix and cryolite 200 mesh and finer present in an amount of 1% by weight of the mix.

14. A refractory cement mix as in claim 6 including graphite 200 mesh and finer in an amount of up to 5% by weight of the mix.

15. A refractory cement mix as in claim 6 including cryolite in a size range of 200 mesh and finer and in an amount of up to 3% by weight of the mix.

16. A refractory cement mix as in claim 7 including cryolite in a size range of 200 mesh and finer and in an amount of up to 3% by weight of the mix.

17. A refractory cement mix as in claim 10 including fused white alumina 16 mesh and finer in an amount of up to 20% by weight of the mix, and fused white alumina 70 mesh and finer in an amount of up to 20% by weight of the mix.

* * * * *